United States Patent Office 3,150,133
Patented Sept. 22, 1964

3,150,133
4,6 - DIAMINO - 1 - (p - BENZYLOXYPHENYL) - 1,2-DIHYDRO - 2,2 - DIMETHYL - s - TRIAZINE AND MINERAL ACID SALTS THEREFOR
David B. Capps, Ann Arbor, Mich., assignor to Parke, Davis & Company, Detroit, Mich., a corporation of Michigan
No Drawing. Filed Jan. 10, 1962, Ser. No. 165,316
3 Claims. (Cl. 260—249.9)

This invention relates to 4,6-diamino-1-(p-benzyloxyphenyl) - 1,2 - dihydro - 2,2 - dimethyl - s - triazine of the formula

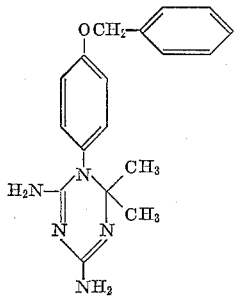

to mineral acid-addition salts thereof, and to methods for their production.

The compounds of the invention can be produced by reacting p-benzyloxyaniline, dicyandiamide and acetone in the presence of a mineral acid. Approximately equimolar quantities of p-benzyloxyaniline and dicyandiamide are recommended, although a moderate excess of either of these reagents can be used. An excess of mineral acid and acetone are normally employed, acetone being a good solvent for the reaction. Other solvents and especially lower alkanols such as methanol and ethanol can also be used. The process of the invention is preferably carried out by heating the reaction mixture at 50–100° C., or at the reflux temperature, for from 6 to 24 hours. Satisfactory results are also obtained by using reaction times and temperatures somewhat outside of this range, for example by carrying out the reaction at room temperature for 5–15 days. The product is isolated directly as a mineral acid-addition salt or, following treatment with a base, as the free base. The compounds of the invention can be obtained in hydrated as well as anhydrous form. The process can also be carried out by stepwise reaction of the described starting materials. For example, p-benzyloxyaniline can be reacted separately with dicyandiamide and the resulting 1-arylbiguanide reacted with acetone in the presence of a mineral acid, as described above.

The free base of the invention, 4,6-diamino-1-(p-benzyloxyphenyl)-1,2-dihydro-2,2-dimethyl - s - triazine, forms acid-addition salts by reaction with mineral acids such as hydrochloric, hydrobromic, hydriodic, sulfuric and phosphoric acids. These mineral acid-addition salts are converted to the free base by treatment with a base such as sodium hydroxide or sodium carbonate.

The compounds of the invention are useful as chemotherapeutic agents and as chemical intermediates. As chemotherapeutic agents, they exhibit a variety of antiparasitic effects. They are antimalarial agents having a relatively short duration of action. They are anthelmintic agents having high potency against pinworms and other helminths. They also have antibacterial and antiviral activity as shown by inhibition of *Streptococcus pyogenes* and herpes simplex. The compounds of the invention can be administered either orally or parenterally, although oral administration is preferred in the case of the mineral acid-addition salts.

The invention is illustrated by the following examples.

Example 1

A mixture of 146 g. of p-benzyloxyaniline, 300 ml. of acetone, 95 ml. of concentrated hydrochloric acid, 750 ml. of methanol, and 66 g. of dicyandiamide is boiled under reflux for 17 hours. The reaction mixture is cooled and the precipitated product, hydrated 4,6-diamino-1-(p-benzyloxyphenyl)-1,2-dihydro-2,2-dimethyl - s - triazine monohydrochloride, is collected on a filter; M.P. 216–220° C. following crystallization from water containing a few drops of concentrated hydrochloric acid.

Example 2

A solution is prepared by dissolving 6 g. of 4,6-diamino-1-(p-benzyloxyphenyl)-1,2-dihydro-2,2-dimethyl - s - triazine monohydrochloride (analyzing for the dihydrate) in 250 ml. of warm methanol. It is cooled in an ice bath and 13.5 ml. of 1-normal sodium hydroxide solution is added. The mixture is then diluted with water to a total volume of 400 ml. and chilled for complete separation of product. The insoluble white product is collected on a filter and dried. It is 4,6-diamino-1-(p-benzyloxyphenyl)-1,2-dihydro-2,2-dimethyl-s-triazine; M.P. 155–158° C. in a bath preheated to 150° C.

The free base is converted to the monohydrobromide by treating a solution of the free base in isopropyl alcohol-ether solution with one equivalent of hydrogen bromide and diluting the mixture with ether for complete separation of product. A sulfate is obtained by treating an aqueous solution of the free base with one equivalent of sulfuric acid and evaporating the mixture to dryness.

I claim:

1. A compound of the class consisting of 4,6-diamino-1-(p-benzyloxyphenyl)-1,2-dihydro-2,2-dimethyl - s - triazine and mineral acid-addition salts thereof.
2. 4,6-diamino-1-(p-benzyloxyphenyl) - 1,2 - dihydro-2,2-dimethyl-s-triazine.
3. 4,6-diamino-1-(p-benzyloxyphenyl) - 1,2 - dihydro-2,2-dimethyl-s-triazine monohydrochloride.

References Cited in the file of this patent

UNITED STATES PATENTS

| 2,803,628 | Crowther | Aug. 20, 1957 |
| 2,836,839 | Cutler | May 27, 1958 |

FOREIGN PATENTS

| 720,456 | Great Britain | Dec. 22, 1954 |
| 831,252 | Great Britain | Mar. 23, 1960 |